Sept. 28, 1926.  
G. J. ABBOTT  
1,601,662  
POWER TRANSMISSION MECHANISM  
Filed May 26, 1924   2 Sheets-Sheet 1
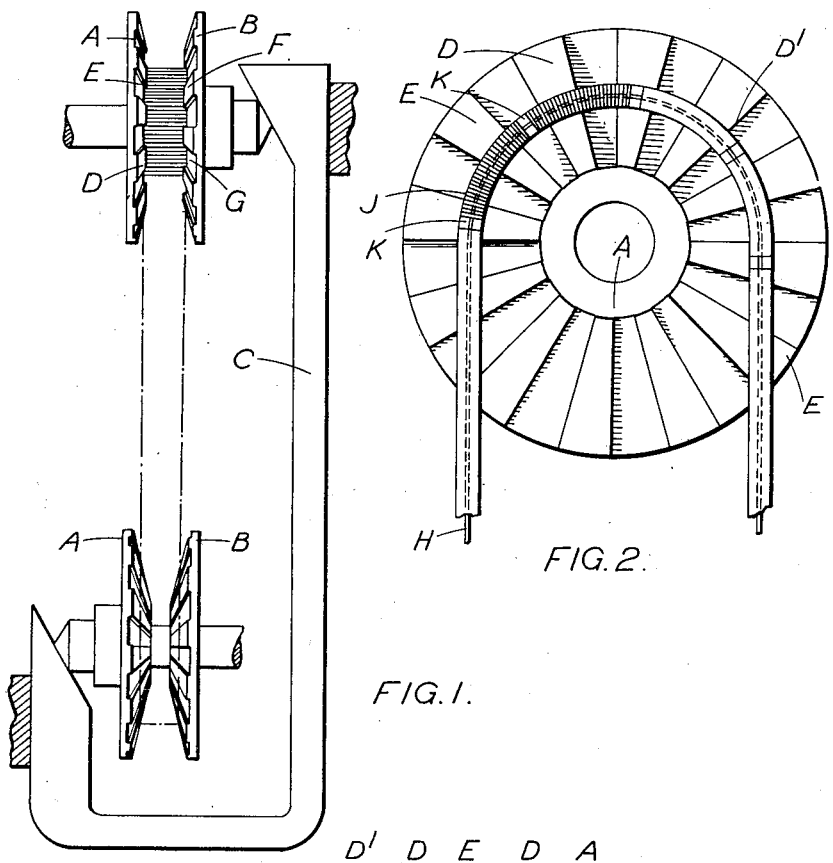
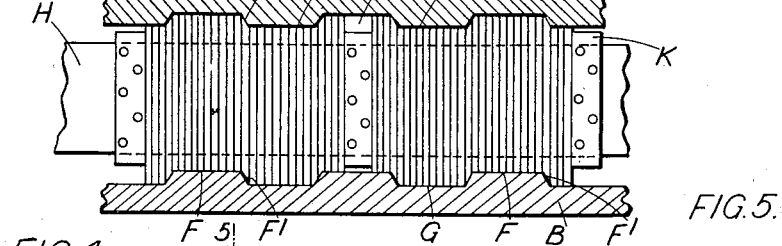
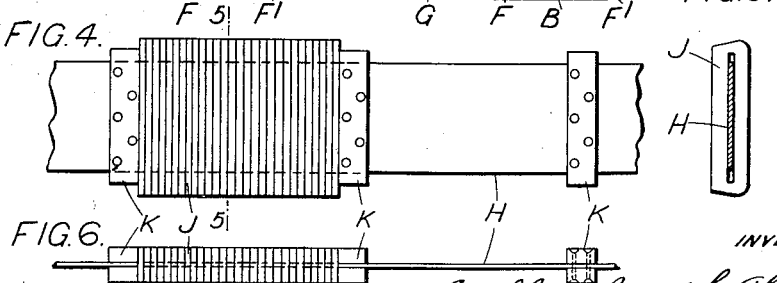

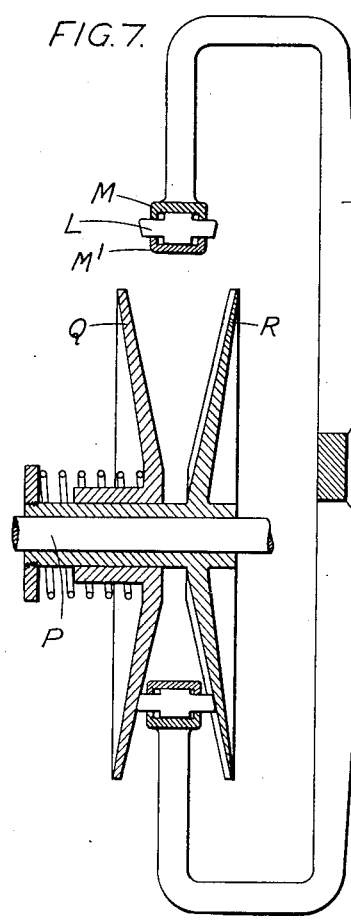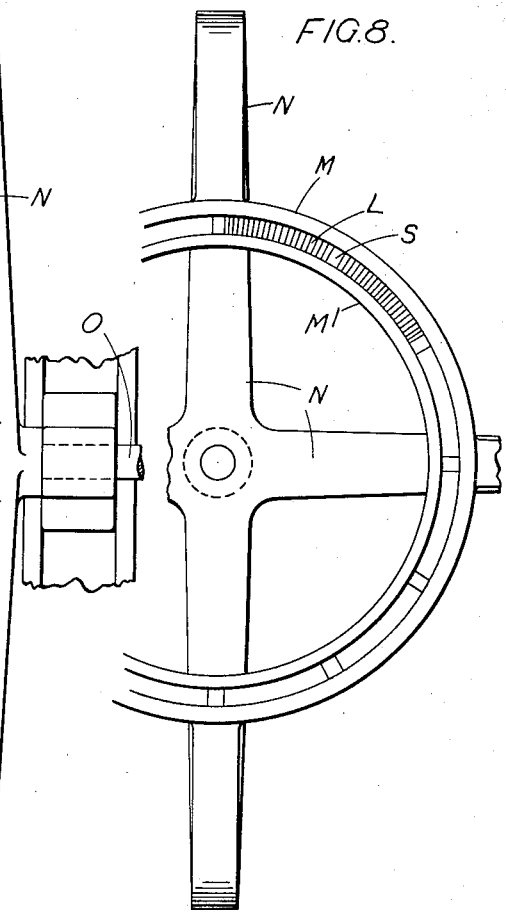

Patented Sept. 28, 1926.

1,601,662

UNITED STATES PATENT OFFICE.

GEOFFREY JOSEPH ABBOTT, OF RUGBY, ENGLAND.

POWER-TRANSMISSION MECHANISM.

Application filed May 26, 1924, Serial No. 716,064, and in Great Britain December 10, 1923.

This invention relates to driving gears and in particular to variable speed gears which include one or more pulleys of variable effective diameter.

As a general rule when expanding pulleys are used, the drive is transmitted through a belt of wedge-shaped cross section, the sides of the belt making frictional contact with the inclined faces of the pulley flanges at whatever diameter the pulley is working. Alternatively, when two oppositely inclined conical pulleys are used, the drive is transmitted by a flat belt which can slide over the conical faces to vary the transmission ratio.

According to the present invention the drive is transmitted to or from a pulley of variable effective diameter by means of a transmission member comprising a support carrying a series of elements adapted to move upon the support to form what may be termed compound teeth of variable pitch, the number of elements in each tooth being capable of variation to suit the dimensions of recesses in the pulley at whatever diameter the pulley may be working.

When one or more pulleys of the expanding type are used, the elements are mounted to move across, i. e. in a direction at right angles to the length of their supporting member, so that the ends of the elements can engage depressions formed in one or both flanges of the expanding pulley at whatever diameter the pulley is working.

In a simple construction the depressions in the driving flanges are formed radial so that in that case the width of the recesses progressively increases from the axis of the pulley towards its circumference. The ribs or projections separating these depressions or the edges of these ribs are so shaped that they cause the requisite number of elements automatically to move relatively to and thus project laterally from their support to constitute what may for practical purposes be deemed a definite tooth built up from a number of adjacent elements to engage the recess in the driving flange, irrespective of the diameter at which the pulley is working and irrespective of the width or position of the recess. Hence, the driving connection may be described as being of variable pitch, the compound teeth or projections being automatically set so as to project at the requisite intervals and so as to constitute teeth of the requisite width, whatever the dimensions and spacing of the depressions with which these teeth are to engage.

The support for the driving elements may be of any convenient form and in one construction comprises an endless band or tension member adapted to connect two similar expanding pulleys. The tension member may be formed from one or more endless wires or series of wires or may comprise one or more flexible bands of metal, a ribbon of woven wire or a series of rigid links pivotally connected together to form a chain. This support carries a series of plates, constituting the driving elements, closely packed together so as to form a belt-like member. The plates may be slotted and threaded upon the support, in which case the slots are of such shape that each plate can independently move across, i. e., in a lateral direction with relation to its supporting member, but is prevented from moving longitudinally thereon by stops provided at intervals along the tension member. These stops not only prevent longitudinal movement of the plates along the tension member, but also maintain the plates in close contact with one another, so that the friction between them prevents lateral displacement after the plates have been set in the manner above described. In such an arrangement any known means may be used for causing one pulley to expand while the other contracts, and the individual plates or groups of plates are set or laterally displaced when their ends come into engagement with the inclined or rounded edge or face of a projecting rib, so as to constitute a series of laterally projecting teeth adapted to engage the grooves of one pulley flange and the ribs of the opposite flange and thus constitute driving teeth. Since in the preferred arrangement these plates or elements are so moved upon their support before they have actually to transmit the drive, it is only necessary in setting the elements to overcome the friction to lateral movement which exists between the plates themselves and their support.

Alternatively, instead of the support for the driving element comprising a flexible member as above described, these plates may be mounted to slide at right angles to the plane of rotation of a rigid annular member, which may constitute a driving connection between two similar expanding pulleys or may be so mounted with relation to a single expanding pulley as to constitute either the driving member therefor or the member driven thereby.

A transmission member according to this invention comprising a flexible support and a series of plates or elements mounted to slide laterally thereon in the manner described, is primarily adapted for use with one or more pulleys of variable effective diameter, but can nevertheless be employed to drive pulleys of fixed diameter so long as such pulleys are provided with depressions with which the ends of the plates or elements can engage in the manner described.

The invention may be carried into effect in numerous ways and in the accompanying drawings two forms of variable speed gear are illustrated by way of example in a purely diagrammatic manner. In these drawings—

Figure 1 is a plan of variable speed gear comprising two expanding pulleys connected by a flexible transmission member according to this invention.

Figure 2 is a side elevation of one of the pulleys on an enlarged scale, one pulley flange being removed.

Figure 3 is a development on an enlarged scale, showing a portion of the flexible driving member illustrated in Figure 2 and the two ribbed pulley flanges in section with which it engages.

Figure 4 shows a portion of the flexible driving member as seen in Figure 3 on the same scale.

Figure 5 is a section on the line 5—5 of Figure 4, and

Figure 6 an edge view of Figure 4.

Figure 7 shows an alternative form of variable speed gear in sectional side elevation.

Figure 8 is an end elevation of the apparatus shown in Figure 7, the expanding pulley being omitted.

In the constructions illustrated in Figures 1–6, two similar expanding pulleys are shown each comprising inclined flanges A and B so mounted upon the shaft to which they are keyed that when one pair of flanges is moved towards one another to increase the effective diameter of one pulley, the two flanges of the other pulley are correspondingly separated to reduce the effective diameter of that other pulley. Any known means may be employed to effect this expansion and contraction of the pulleys, the example illustrated in Figure 1 showing a sliding member C having oppositely inclined cams at either end to engage an inclined member connected to the movable halves or flanges B of the two pulleys.

The pulley flanges A are provided with a series of alternate radial projections D and depressions E, the opposite pulley flange B having radial projections F which are opposite to and register with the depressions E and with radial depressions G which coincide with the ribs D in the opposite pulley flanges and the edges of the ribs D and F are inclined as at D′ F′ (Figure 3) for the purpose hereafter described. The expanding pulleys are connected by a flexible transmission member comprising an endless band of steel or suitable material H carrying a series of slotted plates J of approximately the shape illustrated in Figure 5. These plates J are made of thin metal, and in the diagrammatic drawings accompanying this specification, each plate is represented by a single line. The slot in the plate J is such that each plate can move laterally relatively to the flexible band H, i. e., in a plane at right angles to that in which the pulley rotates. On the other hand these plates cannot move relatively to the length of the band H since this band is provided at suitable intervals with stops K which are riveted or otherwise connected to the band. The slotted plates J are threaded upon the band so as to be closely packed thereon between the stops K as shown and each plate is independently movable laterally relatively to the length of the band as and when it comes into contact with a projection on either of the faces of the pulley flanges.

The ends of the plates can thus project laterally from one side or other of the band to constitute a series of driving teeth to engage the ribs and depressions in the opposite faces of the pulley flanges and thus in effect form a positive driving connection between the two pulleys. Since the width of a driving rib or depression is greater near the outer circumference of the pulley than near the axis about which the pulley rotates, the width of the tooth necessary to engage such a rib or depression has to be varied in accordance with the diameter at which the pulley is working.

According to this invention the plates or elements J are automatically set, i. e., the requisite number of plates is automatically displaced in a lateral direction so as to constitute a driving tooth of the correct dimensions, by the ends of the plates coming into engagement with the inclined edges D′ F′ and faces D and F of the ribs on the opposite pulley flanges so as to form in effect a flexible driving belt having lateral teeth the opposite ends of which respectively engage a depression in one pulley flange and a projection on the other as shown in Figures 1 and 3.

Since the ends of the plates J come into contact with the ribs on the opposite pulley flanges before these plates have actually to take up the driving strain, it is only necessary to overcome the friction to lateral movement which exists between the plates themselves and their flexible support in the setting operation. The precise shape of the ribs or the edges thereof and of the plates which constitute the teeth can of course vary considerably in accordance with the powers to be transmitted and the dimensions of the variable speed gear.

Although primarily adapted for use with pulleys of variable effective diameter as above described, a flexible transmission member having laterally movable plates in accordance with this invention can, if desired, be used for pulleys of constant diameter if such pulleys have depressions with which the ends of the plates can engage so as to effect a positive drive.

In the construction illustrated in Figures 7 and 8 the laterally movable plates are carried by a rigid support instead of being mounted upon a flexible tension member as already described. In this construction an annular member M connected by arms N to a shaft O is capable of being moved as a whole together with its shaft relatively to the shaft P which carries an expanding pulley similar to those shown in Figure 1. The arrangement is such that the annular member can be made either coaxial with the expanding pulley or else be displaced laterally therefrom as shown in the drawings. The expanding pulley is provided with alternate ribs and projections upon its opposite flanges Q R as in the construction already described and an annular member carries plates L the ends of which project laterally from either side of the annular member so as to engage the ribs and projections formed in the opposite flanges of the pulley as in the case of the plates J already described.

The plates L are conveniently retained in position against the annular member M by means of an inner annular ring M' which is secured to the outer annulus M and spaced therefrom by means of fixed distance pieces S which also constitute stops to prevent circumferential movement of the plates L relatively to the annulus M.

In the construction above described by moving the annular member M and its shaft O transversely relatively to the shaft P of the expanding pulley, the transmission ratio is varied and the plates or elements L as before are automatically set by coming into engagement with the edges of the ribs and projections formed on the flanges Q and R. With such an arrangement a direct drive is obtained when the two shafts P and O are coaxial in which case the drive is transmitted by all the plates L simultaneously. If desired a positive reversing gear may be provided in conjunction with such a gear.

It is to be appreciated that the particular form of support for laterally movable elements for use with either fixed pulleys or pulleys of variable effective diameter may be modified within wide limits without departing from this invention and that more than one row of plates or driving elements may be employed if desired, the grooves and depressions in the flanges of the pulley being either radial as illustrated or of any other suitable shape.

What I claim as my invention and desire to secure by Letters Patent is:—

1. For use with a gear which includes a pulley having recesses in its face, a power transmission member comprising a support and a plurality of elements mounted to move upon the support to form a series of compound teeth of a pitch intermediately variable throughout a wide range, the number of elements in each tooth being capable of variation to suit the dimensions of the cooperating recesses in the pulley.

2. For use with a gear which includes a pulley of variable effective diameter having depressions formed in its face, a power transmission member of a pitch intermediately variable throughout a wide range, comprising a support and a plurality of elements so mounted to slide thereon that a compound tooth is formed built up from at least two of these elements to engage a depression in the face of the pulley.

3. For use with a gear which includes a pulley of variable effective diameter, a power transmission member comprising a support and a plurality of elements each mounted to slide thereon so that the end of at least two elements can project laterally from its support to form a compound tooth of the correct width to engage a depression formed in the face of the pulley irrespective of the diameter at which the pulley is working.

4. For use with a variable speed gear which includes an expanding pulley having projections and depressions formed on the opposite driving flanges thereof, a power transmission member comprising a support, a plurality of elements mounted upon the support, stops on the support between each group of elements to prevent movement of the elements along or around said support each element being independently movable upon the support in a plane at right angles to that in which the pulley rotates so that the opposite ends of at least two elements in any group of elements form a compound tooth and respectively engage the projections and depressions on the opposite flanges of the pulley in an automatic manner irrespective of the diameter at which the pulley is working.

5. For use with a gear which includes a pulley of variable effective diameter a power transmission member comprising a flexible support, a plurality of elements each mounted to slide so that the ends of at least two adjacent elements can project laterally from the support to form a compound tooth of the correct width to engage depressions in the face of the pulley irrespective of the diameter at which the pulley is working and stops on the support between each group of elements so as to prevent longitudinal movement of the elements upon the flexible support.

6. For use with a variable speed gear which includes an expanding pulley, having projections and depressions formed in the opposite driving flanges thereof, a power transmission member comprising a flexible support, a plurality of elements mounted thereon and stops on the flexible support between each group of elements, each element being independently movable upon the support in a plane at right angles to that in which the pulley rotates so that the opposite ends of a least two adjacent elements in any group can form a compound tooth of the correct width to engage respectively the projections and depressions on the opposite flanges of the pulley in an automatic manner irrespective of the diameter at which the pulley is working.

7. In a transmission gear the combination of a driving member and a driven member, one of which includes a pulley of variable effective diameter, and a driving connection between these members of a pit.h intermediately variable throughout a wide range, comprising a support and a series of elements automatically movable upon the support so that at least two adjacent elements project therefrom to form a compound tooth of the correct dimensions to engage depressions in the face of the pulley.

8. In a variable speed gear, the combination of a driving member, a driven member at least one of which includes an expanding pulley having projections and depressions formed on the opposite driving flanges thereof, and a power transmission member of variable pitch connecting said driving and driven members comprising a support and a plurality of elements each independently movable upon the support in a plane at right angles to that in which the pulley rotates so that the opposite ends of at least two adjacent plates form a compound tooth of the correct width to engage respectively the ribs and depressions formed in the opposite driving flanges of the expanding pulley, irrespective of the diameter at which this pulley is working.

9. In a variable speed gear, the combination of a driving member, a driven member at least one of which includes an expanding pulley having projections on one driving flange disposed opposite to corresponding depressions on the other driving flange, means for expanding and contracting said pulley, a driving connection between said members comprising a flexible tension member, a plurality of plates mounted thereon and stops on the tension member between each group of plates to prevent relative longitudinal movement between the plates and the tension member, and means for moving each plate transversely to the length of the tension member so that the opposite ends of at least two adjacent plates form a compound tooth of the correct width to engage respectively the ribs and depressions formed in the opposite driving flanges of the expanding pulley irrespective of the diameter at which this pulley is working.

10. In a variable speed gear, the combination of a driving member, a driven member, at least one of which includes an expanding pulley having projections on one driving flange disposed opposite to corresponding depressions on the other driving flange, means for expanding and contracting said pulley, a driving connection between said members comprising a flexible tension member, a plurality of plates flexible in the direction of their length mounted thereon and stops on the tension member between each group of plates to prevent relative longitudinal movement between the plates and the tension member, and means for moving each plate transversely to the length of the tension member so that the opposite ends of at least two adjacent plates form a compound tooth of the correct width to engage respectively the ribs and depressions formed in the opposite driving flanges of the expanding pulley irrespective of the diameter at which this pulley is working.

11. In a variable speed gear, the combination of a driving member, a driven member, at least one of which includes an expanding pulley having projections on one driving flange disposed opposite to corresponding depressions on the other driving flange, means for expanding and contracting said pulley, a driving connection between said members comprising a support, a plurality of plates independently movable relatively to the support and stops between each group of plates to prevent movement of the plates along the support, the projections on the pulley flanges being so shaped that lateral movement is automatically imparted to each plate upon its support to constitute a compound tooth of the correct width and pitch before such teeth have to take up the driving stress, the opposite ends of these teeth respectively engaging a projection and depression on the opposite flanges of the pulley irrespective of the diameter at which the pulley is working.

12. In a variable speed gear, the combination of an expanding driving pulley having projections on one driving flange disposed opposite to corresponding depressions on the other driving flange, a similar expanding driven pulley, means for expanding and contracting said pulleys, a driving connection between said pulleys comprising a flexible tension member, a plurality of plates independently movable transversely to the length of the said tension member and stops on the tension member between each group of plates to prevent longitudinal movement of the plates thereon, the projections being so shaped that each plate is moved transversely to the tension member before such plates have to take up the driving stress so that the requisite number of plates is automatically moved and so caused to project laterally from the tension member to form a compound tooth of the correct width, the ends of which respectively engage a projection and depression on the opposite flanges of the pulley irrespective of the diameter at which the pulley is working.

13. In a variable speed gear, the combination of an expanding driving pulley having projections on one driving flange disposed opposite to corresponding depressions on the other driving flange, a similar expanding driven pulley, means for expanding and contracting said pulleys, a driving connection between said pulleys comprising a flexible tension member, a plurality of plates independently movable transversely to the length of the said tension member and stops on the tension member between each group of plates to prevent longitudinal movement of the plates thereon, the projections being so shaped that each plate is moved transversely to the tension member before such plates have to take up the driving stress so that the requisite number of plates is automatically moved and so caused to project laterally from the tension member to form a compound tooth of the correct width, the ends of which respectively engage a projection and depression on the opposite flanges of the pulley irrespective of the diameter at which the pulley is working, the number of plates packed between each pair of stops being such with relation to the width of the ribs and depressions in the pulley flange that at least one compound tooth always projects from each side of each group of plates.

14. A power transmission member comprising in combination, a support, and a plurality of closely adjacent thin laminations independently movable in a direction transverse to the direction of travel of said member, said laminations being adapted to be moved transversely to form a series of teeth each containing a plurality of said laminations, the pitch and size of said teeth being continuously variable in small steps equal to the thickness of a single one of said laminations.

15. A power transmission member adapted for use with a pulley having recesses in its face, comprising in combination, a support, and a plurality of closely adjacent thin laminations mounted upon said support and independently movable in a transverse direction relative thereto, said laminations being adapted to be displaced transversely by the projections on the face of the pulley to form a series of teeth each containing a number of said laminations corresponding to the dimensions of the co-operating recesses in the pulley.

16. A power transmission member adapted for use with a pulley of variable effective diameter having recesses in its face, comprising in combination, a support, a plurality of groups of closely adjacent thin laminations mounted upon said support and independently movable in a lateral direction relative thereto, and stops on the support between each group of laminations to prevent longitudinal movement of the laminations relative to the support, said laminations being adapted to be displaced laterally by the projections on the face of the pulley to form a series of teeth each containing a number of said laminations corresponding to the dimensions of the cooperating recesses in the pulley, the pitch and size of said teeth being continuously variable in small steps equal to the thickness of a single one of said laminations, so that correct engagement is secured between the power transmission member and the pulley at whatever effective diameter the latter is operated.

In testimony whereof I have signed my name to this specification.

GEOFFREY JOSEPH ABBOTT.